United States Patent
Teel et al.

(10) Patent No.: US 6,511,035 B1
(45) Date of Patent: Jan. 28, 2003

(54) ACTIVE VIBRATION ISOLATION SYSTEMS WITH NONLINEAR COMPENSATION TO ACCOUNT FOR ACTUATOR SATURATION

(75) Inventors: Andrew Richard Teel, Goleta; Luca Zaccarian, Santa Barbara; Jacek Justyn Marcinkowski, San Pedro, all of CA (US)

(73) Assignee: Newport Corporation, Irvine, CA (US)

( * ) Notice: Subject to any disclaimer, the term of this patent is extended or adjusted under 35 U.S.C. 154(b) by 0 days.

(21) Appl. No.: 09/627,804

(22) Filed: Jul. 28, 2000

Related U.S. Application Data (60) Provisional application No. 60/146,927, filed on Aug. 3, 1999.

(51) Int. Cl.⁷ .............................................. F16M 13/00
(52) U.S. Cl. ..................................................... 248/550
(58) Field of Search ................................ 248/550, 559, 248/638, 669, 678, 676

(56) References Cited

U.S. PATENT DOCUMENTS

| | | |
|---|---|---|
| 1,143,165 A | 6/1915 | Begusch |
| 1,306,906 A | 6/1919 | Jaques, Sr. |
| 2,367,139 A | 1/1945 | Ress |
| 3,357,268 A | 12/1967 | Richter |

(List continued on next page.)

FOREIGN PATENT DOCUMENTS

| | | |
|---|---|---|
| CA | 2199423 | 3/1996 |
| GB | 2 124 402 A | 7/1982 |
| GB | 2 131 971 A | 6/1984 |
| JP | 03021894 | 1/1991 |
| JP | 08088167 | 9/1994 |
| JP | 09330875 | 6/1996 |
| JP | 10144601 | 11/1996 |
| WO | 96-07118 | 3/1996 |

OTHER PUBLICATIONS

J. M. Kahn, C. A. Burrus, and G. Raybon, High–Stability 1.5 um External–Cavity Semiconductor Lasers for Phase–Lock Applications, Photonics Technology Letters, vol. 1. No. 7, Jul. 1989.

A. Schremer and C. L. Tang, "Single–Frequency tunable external–cavity semiconductor laser using an electro–optic birefringent modulator", Appl. Phys. Lett., vol. 55, No. 1, Jul. 3, 1989.

M. W. Maeda, J. S. Patel, D. A. Smith, Chinlon Lin, M. A. Saifi, and A. Von Lehman, "An Electronically Tunable Fiber Laser with a Liquid–Crystal Etalon Filter as the Wavelength–Tuning Element", IEEE Photonics Technology Letters, vol. 2, No. 11, Nov. 1990.

(List continued on next page.)

*Primary Examiner*—Ramon O. Ramirez
*Assistant Examiner*—A. Joseph Wujciak
(74) *Attorney, Agent, or Firm*—Irell & Manella, LLP (57) ABSTRACT

A vibration control module that compensates for actuator saturation. The control module includes a sensor that provides an output signal which corresponds to a movement of an element. The module also has an actuator that can move and isolate the element. The control module is controlled by a controller that performs a control routine. The control routine may include a first anti-windup stage that is coupled to the input and output of a nominal controller. The output of the nominal controller drives the actuator. The sum of the nominal controller and the actuator saturation value are provided to the input of the nominal controller. The first anti-windup stage may have a transfer function that replicates the transfer function of the control module. The first anti-windup stage provides stability for the module when the actuator is saturated. An output of a second anti-windup stage is provided as another input to the nominal controller. The inputs to the second anti-windup stage are a nominal controller state variable and the input to the first anti-windup stage.

22 Claims, 5 Drawing Sheets

U.S. PATENT DOCUMENTS

| | | |
|---|---|---|
| 3,442,475 A | 5/1969 | Rivin |
| 3,460,786 A | 8/1969 | Rivin |
| 3,478,608 A | 11/1969 | Met |
| 3,533,012 A | 10/1970 | Johnson et al. |
| 3,565,515 A | 2/1971 | De Mey II |
| 3,577,791 A | 5/1971 | Vanden Broek |
| 3,578,278 A | 5/1971 | Pickering |
| 3,601,476 A | 8/1971 | MacKenzie |
| 3,620,558 A | 11/1971 | MacMillan |
| 3,667,525 A | 6/1972 | Spieth |
| 3,751,025 A | 8/1973 | Beery et al. |
| 3,784,146 A | 1/1974 | Mathews |
| 3,917,201 A | 11/1975 | Roll |
| 3,945,246 A | 3/1976 | Wadensten |
| 4,030,811 A | 6/1977 | Khoe et al. |
| 4,065,203 A | 12/1977 | Goell et al. |
| 4,079,404 A | 3/1978 | Comerford et al. |
| 4,088,396 A | 5/1978 | Edelstein |
| 4,119,363 A | 10/1978 | Camlibel et al. |
| 4,144,504 A | 3/1979 | Leggett et al. |
| 4,164,363 A | 8/1979 | Hsu |
| 4,167,744 A | 9/1979 | Nyul |
| 4,237,474 A | 12/1980 | Ladany |
| 4,268,113 A | 5/1981 | Noel, Jr. |
| 4,295,152 A | 10/1981 | Khoe et al. |
| 4,296,998 A | 10/1981 | Dufft |
| 4,316,678 A | 2/1982 | F'Geppert |
| 4,332,469 A | 6/1982 | Wendland |
| 4,350,867 A | 9/1982 | Kinoshita et al. |
| 4,355,323 A | 10/1982 | Kock |
| 4,357,072 A | 11/1982 | Goodfellow et al. |
| 4,387,956 A | 6/1983 | Cline |
| 4,403,243 A | 9/1983 | Hakamada |
| 4,435,037 A | 3/1984 | Abramson et al. |
| 4,469,399 A | 9/1984 | Cowen et al. |
| 4,469,929 A | 9/1984 | Rosen et al. |
| 4,479,698 A | 10/1984 | Landis et al. |
| 4,500,165 A | 2/1985 | Scholl et al. |
| 4,506,108 A | 3/1985 | Kersch et al. |
| 4,523,802 A | 6/1985 | Sakaguchi et al. |
| 4,523,810 A | 6/1985 | Goss et al. |
| 4,525,659 A | 6/1985 | Imahashi et al. |
| 4,550,410 A | 10/1985 | Chenausky et al. |
| 4,615,031 A | 9/1986 | Eales et al. |
| 4,623,220 A | 11/1986 | Grabbe et al. |
| 4,647,147 A | 3/1987 | Pikulski et al. |
| 4,647,331 A | 3/1987 | Koury, Jr. et al. |
| 4,657,429 A | 4/1987 | Morris |
| 4,664,732 A | 5/1987 | Campbell et al. |
| 4,673,244 A | 6/1987 | Miles |
| 4,673,245 A | 6/1987 | Kling et al. |
| 4,677,290 A | 6/1987 | Mitch |
| 4,678,271 A | 7/1987 | Beaulieu |
| 4,679,908 A | 7/1987 | Goodwin |
| 4,701,013 A | 10/1987 | Jurczyszyn et al. |
| 4,702,556 A | 10/1987 | Ishii et al. |
| 4,708,429 A | 11/1987 | Clark et al. |
| 4,714,315 A | 12/1987 | Krause |
| 4,720,163 A | 1/1988 | Goodwin et al. |
| 4,746,195 A | 5/1988 | Auracher et al. |
| 4,747,657 A | 5/1988 | Chaoui et al. |
| 4,748,632 A | 5/1988 | Preston |
| 4,759,600 A | 7/1988 | Caron et al. |
| 4,763,979 A | 8/1988 | Heywang |
| 4,767,174 A | 8/1988 | Carenco et al. |
| 4,773,730 A | 9/1988 | Sedlmayr |
| 4,779,946 A | 10/1988 | Pimpinella et al. |
| 4,779,959 A | 10/1988 | Saunders |
| 4,782,223 A | 11/1988 | Suzuki |
| 4,787,691 A | 11/1988 | Lorenzo et al. |
| 4,800,262 A | 1/1989 | Lentine |
| 4,807,750 A | 2/1989 | Ryder et al. |
| 4,823,220 A | 4/1989 | Milster et al. |
| 4,837,768 A | 6/1989 | Schmid |
| 4,842,397 A | 6/1989 | Eisler |
| 4,850,261 A | 7/1989 | Greene |
| 4,850,671 A | 7/1989 | Finzel |
| 4,854,667 A | 8/1989 | Ebata et al. |
| 4,913,527 A | 4/1990 | Jessop |
| 4,914,867 A | 4/1990 | Saito et al. |
| 4,915,482 A | 4/1990 | Collins et al. |
| 4,916,635 A | 4/1990 | Singer et al. |
| 4,938,564 A | 7/1990 | Romero |
| 4,966,474 A | 10/1990 | Geiger |
| 4,978,910 A | 12/1990 | Knox et al. |
| 4,988,159 A | 1/1991 | Turner et al. |
| 4,988,165 A | 1/1991 | Ishii et al. |
| 5,000,415 A | 3/1991 | Sandercock |
| 5,044,719 A | 9/1991 | Nakamura |
| 5,058,124 A | 10/1991 | Cameron et al. |
| 5,062,012 A | 10/1991 | Maeda et al. |
| 5,068,749 A | 11/1991 | Patel |
| 5,071,108 A | 12/1991 | Houghton, Jr. |
| 5,077,747 A | 12/1991 | Hemmer et al. |
| 5,132,824 A | 7/1992 | Patel et al. |
| 5,138,496 A | 8/1992 | Pong |
| 5,140,470 A | 8/1992 | Luecke |
| 5,146,532 A | 9/1992 | Hodge |
| 5,150,236 A | 9/1992 | Patel |
| 5,172,160 A | 12/1992 | Van Eijk et al. |
| 5,179,618 A | 1/1993 | Anton |
| 5,183,350 A | 2/1993 | Kramer |
| 5,189,725 A | 2/1993 | Bensel, III et al. |
| 5,191,587 A | 3/1993 | Hanson et al. |
| 5,194,993 A | 3/1993 | Bedzyk |
| 5,214,735 A | 5/1993 | Henneberger et al. |
| 5,218,258 A | 6/1993 | Shirasu et al. |
| 5,218,610 A | 6/1993 | Dixon |
| 5,219,051 A | 6/1993 | Davis |
| 5,251,863 A | 10/1993 | Gossman et al. |
| 5,285,995 A | 2/1994 | Gonzalez et al. |
| 5,289,559 A | 2/1994 | Wilson |
| 5,300,755 A | 4/1994 | Nishitani et al. |
| 5,311,278 A | 5/1994 | Rosencher |
| 5,319,435 A | 6/1994 | Melle et al. |
| 5,321,539 A | 6/1994 | Hirabayashi et al. |
| 5,327,061 A | 7/1994 | Gullapalli |
| 5,337,383 A | 8/1994 | DeAngelis et al. |
| 5,367,140 A | 11/1994 | Jonaneh et al. |
| 5,379,980 A * | 1/1995 | Houghton, Jr. et al. ..... 248/550 |
| 5,410,145 A | 4/1995 | Coroy |
| 5,428,225 A | 6/1995 | Silva et al. |
| 5,428,635 A | 6/1995 | Zhiglinsky et al. |
| 5,434,944 A | 7/1995 | Kerry et al. |
| 5,434,945 A | 7/1995 | Burek et al. |
| 5,446,519 A | 8/1995 | Makinouchi |
| 5,463,647 A | 10/1995 | Pan |
| 5,469,265 A | 11/1995 | Measures et al. |
| 5,499,261 A | 3/1996 | Welch et al. |
| 5,502,598 A | 3/1996 | Kimura et al. |
| 5,528,718 A | 6/1996 | Ray et al. |
| 5,530,547 A | 6/1996 | Arnold |
| 5,530,785 A | 6/1996 | Sakamoto et al. |
| 5,553,186 A | 9/1996 | Allen |
| 5,563,972 A | 10/1996 | Krausse et al. |
| 5,564,537 A | 10/1996 | Shoureshi |
| 5,570,444 A | 10/1996 | Janssen et al. |
| 5,581,077 A | 12/1996 | Chirovsky et al. |
| 5,598,500 A | 1/1997 | Crespel et al. |
| 5,603,387 A | 2/1997 | Beard et al. |
| 5,617,501 A | 4/1997 | Miller et al. |

| | | |
|---|---|---|
| 5,619,609 A | 4/1997 | Pan et al. |
| 5,638,267 A | 6/1997 | Singhose et al. |
| 5,638,482 A | 6/1997 | Winterhoff et al. |
| 5,653,317 A | 8/1997 | Wakui |
| 5,655,045 A | 8/1997 | Morlion et al. |
| 5,660,255 A | 8/1997 | Schubert et al. |
| 5,668,906 A | 9/1997 | Yamamura et al. |
| 5,673,350 A | 9/1997 | Song et al. |
| 5,689,607 A | 11/1997 | Vincent et al. |
| 5,717,804 A | 2/1998 | Pan et al. |
| 5,725,066 A | 3/1998 | Beard et al. |
| 5,737,132 A | 4/1998 | Luecke et al. |
| 5,745,633 A | 4/1998 | Giebel et al. |
| 5,748,821 A | 5/1998 | Schempp et al. |
| 5,751,877 A | 5/1998 | Ishizaka et al. |
| 5,757,561 A | 5/1998 | Sechrist et al. |
| 5,758,004 A | 5/1998 | Alarcon et al. |
| 5,761,360 A | 6/1998 | Grois et al. |
| 5,765,800 A | 6/1998 | Watanabe et al. |
| 5,774,614 A | 6/1998 | Gilliland et al. |
| 5,793,920 A | 8/1998 | Wilkins et al. |
| 5,793,921 A | 8/1998 | Wilkins et al. |
| 5,794,912 A | 8/1998 | Whittaker et al. |
| 5,812,958 A | 9/1998 | Mayama |
| 5,823,307 A | 10/1998 | Schubert et al. |
| 5,825,558 A | 10/1998 | Farmiga et al. |
| 5,852,519 A | 12/1998 | Do et al. |
| 5,880,894 A | 3/1999 | Blakley |
| 5,909,324 A | 6/1999 | Bryant et al. |
| 5,930,057 A | 7/1999 | Sechrist et al. |
| 5,941,920 A | 8/1999 | Schubert |
| 5,946,023 A | 8/1999 | Blanding |
| 5,963,695 A | 10/1999 | Joyce |
| 6,016,230 A | 1/2000 | Nunnally et al. |
| 6,022,005 A | 2/2000 | Gran et al. |
| 6,036,162 A * | 3/2000 | Hayashi ...................... 248/550 |
| 6,056,447 A | 5/2000 | Caras |
| 6,087,621 A | 7/2000 | Kang et al. |
| 6,198,580 B1 | 3/2001 | Dallakian |
| 6,202,492 B1 * | 3/2001 | Ohsaki ....................... 248/550 |
| 6,209,841 B1 * | 4/2001 | Houghton, Jr. et al. ..... 248/550 |
| 6,213,442 B1 * | 4/2001 | Ivers et al. ................. 248/550 |

OTHER PUBLICATIONS

Katsuhiko Hirabayashi, Hiroyuki Tsuda, and Takashi Kurokawa, "Tunable Liquid–Crystal Fabry–Perol Interferometer Filter for Wavelength–Division Multiplexing Communication Systems", Journal of Lightwave Technology, vol. 11, No. 12, Dec. 1993.

Stephen R. Mallinson, "Wavelength–selective filters for single–mode fiber WDM systems using Fabry–Perot interferometers", APPLIED OPTICS, vol. 26, No. 3, Feb. 1, 1987.

W. Gunning, J. Pasko, J. Tracy, "A liquid crystal tunable spectral filter: visible and infrared operation", SPIE vol. 268 Imaging Spectroscopy (1981).

Hiroyuki Tsuda, Katsuhiko Hirabayashi, Yuichi Tohmori, and Takashi Kurokawa, "Tunable Light Source Using a Liquid–Crystal Fabry–Perot Interferometer", IEEE Photonics Technology Letters, vol. 3. No. 6. Jun. 1991.

John R. Andrews, "Low Voltage Wavelength Tuning of an External Cavity Diode Laser Using a Nematic Liquid Crystal–Containing Birefringent Filert", IEEE Photonics Technology Letters, vol. 2, No. 5, May 1990.

N. A. Olsson and J. P. Van Der Ziel, "Performance Characteristics of 1.5–um External Cavity Semiconductor Lasers for Coherent Optical Communication", Journal Of Lightwave Technology, vol. LT–5. No. 4, Apr. 1987.

Hecht Optics Second Edition, Eugene Hecht, reprinted 1990, reference text, pp. 303 # 368.

Rivin, Eugene I., "Vibration isolation of precision equipment", Precision Engineering, 1995, pp. 41–56, vol. 7.

"Marsh Mellow Springs Vibration Isolation Design Manual", 1998, Firestone Industrial Products Company.

Rivin, Eugene I., "Shaped Elastomeric Components for Vibration Control Devices", Sound and Vibration, Jul. 1999, pp. 18–23, vol. 33, No. 7.

* cited by examiner

ACTIVE VIBRATION ISOLATION SYSTEMS WITH NONLINEAR COMPENSATION TO ACCOUNT FOR ACTUATOR SATURATION

CROSS REFERENCE TO RELATED APPLICATION

This application claims priority to Application No. 60/146,927 filed on Aug. 3, 1999.

BACKGROUND OF THE INVENTION

1. Field of the Invention

The present invention relates to vibration control modules.

2. Background Information

Vibration control modules are used to isolate an element from a source of vibration. For example, integrated circuits are typically fabricated on a platform with photolithographic equipment. Relative movement between the platform and the light source must be kept at a minimum to insure accurate fabrication of the integrated circuits.

The platform is typically attached to a table that is located on a floor of a clean room. The floor has a natural vibrational tremor that can be transmitted into the table. Additionally, the integrated circuits are typically fabricated on a wafer. Each wafer is loaded onto the platform in a docking routine. Docking the wafer creates a shock load that is transmitted into the platform. The floor tremor and the shock load may cause relative displacement between the platform and the light source, thereby reducing the accuracy of the fabrication process.

U.S. Pat. No. 5,000,415 issued to Sandercock and assigned to the assignee of the present invention, Newport Corp., discloses a vibration isolator that has an active isolator assembly which actively isolates a load from a floor. The load may be the platform of a photolithographic table. The active isolator assembly includes a plurality of piezoelectric actuators that can vary the distance between the load and the floor surface to compensate for movement in the floor. For example, the floor may oscillate so that the floor surface moves toward the load and away from the load. When the floor moves toward the load the piezoelectric actuators contract so that the motion of the load relative to inertial space is reduced compared to that of the floor. Likewise, when the floor moves away from the load the actuators expand.

The active vibration isolator disclosed in the Sandercock patent includes a sensor that senses the movement of the floor and circuitry to provide a control loop to synchronize the contraction/expansion of the actuators with the movement in the floor. Sandercock also discloses the use of sensors which sense the velocity of the load to provide a feedback loop that is coupled to the feedforward loop.

The actuators are typically controlled by a linear control system that includes a controller such as a digital signal processor (DSP). The controller provides output signals to drive the actuators and isolate the load, in response to the output signals of the sensors. There may be situations where the floor disturbance causes the controller to provide a signal to move the actuators beyond the physical capabilities of the piezoelectric transducers. This event is typically referred to as saturation.

During saturation the load is displaced a value that is different from the expectations of the control system. The feedback is prone to self sustaining oscillations.

The problem of modifying linear control systems to account for actuator saturation without compromising performance under normal operations is typically referred to as "anti-windup". The term anti-windup is used because most linear control systems use a proportional plus integral plus derivative control scheme wherein the integrator would "windup" to excessively large values during saturation.

Figure 1:
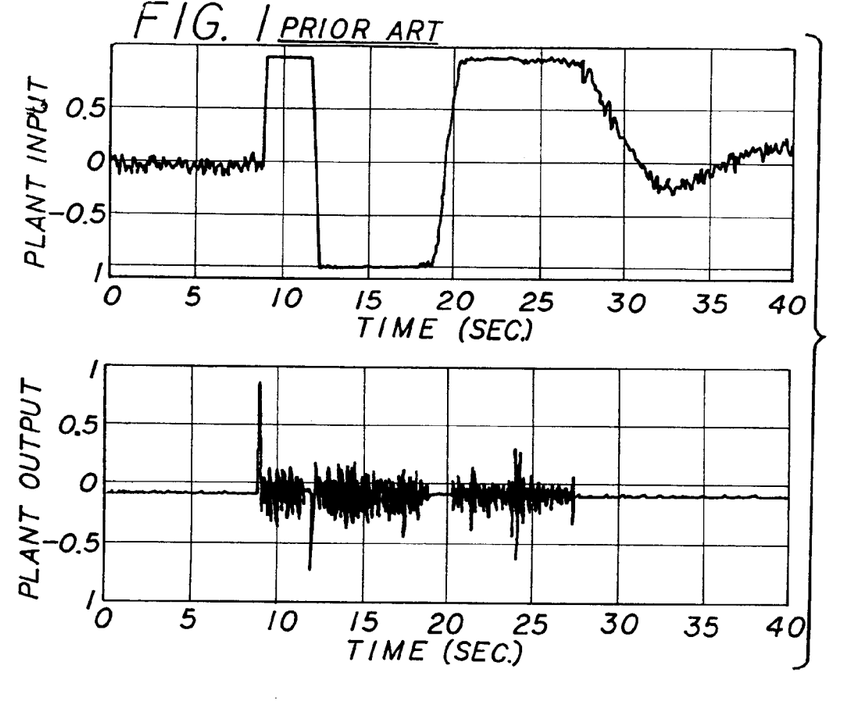
FIG. 1 are graphs showing the plant input and plant output of a vibration control module subject to saturation without anti-windup.

FIG. 1 shows an experiment performed on a saturated table with a vibration control module that does not have an anti-windup feature. The plant input is the movement of the module actuators. The plant output is the movement of the load as sensed by the sensors. As shown, approximately 20 seconds transpired before the system stabilized from a saturation event. This 20 seconds can be critical if the load is a photolithographic table used to mass produce integrated circuits. Every second required to stabilize the table reduces the throughput of the manufacturing process.

BRIEF SUMMARY OF THE INVENTION

One embodiment of the present invention is a vibration control module that includes a sensor that can sense a movement of an element and an actuator that can move the element. The sensor and actuator are coupled to a controller that performs a control routine wherein an output of a first anti-windup stage is summed with the output of the sensor. The summation is provided as an input to a nominal controller. The output of the nominal controller is provided to the actuator. The input to the first anti-windup stage is a summation of the output of the nominal controller and an actuator saturation level.

DETAILED DESCRIPTION OF THE PREFERRED EMBODIMENT

In general the present invention includes a vibration control module that compensates for actuator saturation. The control module includes a sensor that provides an output signal which corresponds to a movement of an element. The module also has an actuator that can move and isolate the element. The control module is controlled by a controller that performs a control routine. The control routine may include a first anti-windup stage that is coupled to the input and output of a nominal controller. The output of the nominal controller drives the actuator. The sum of the nominal controller and an actuator saturation value are provided as an input to the first anti-windup stage. The output of the first anti-windup stage is summed with the output signal of the sensor and provided to the input of the nominal controller. It being understood that the term summation is used for both an additive and a subtractive process. The first anti-windup stage may have a transfer function that replicates the transfer function of the control module. The first anti-windup stage provides stability for the module when the actuator is saturated.

The control system may include a DC bias estimator that is summed with the nominal controller input to remove a DC signal in the sensor output signal. Additionally, the control system may include a second anti-windup stage that dissipates excessive values generated in the nominal controller. The second anti-windup stage may provide an input to the nominal controller only when the actuators are saturated so as to not interfere with the system during normal operation.

Figure 2:
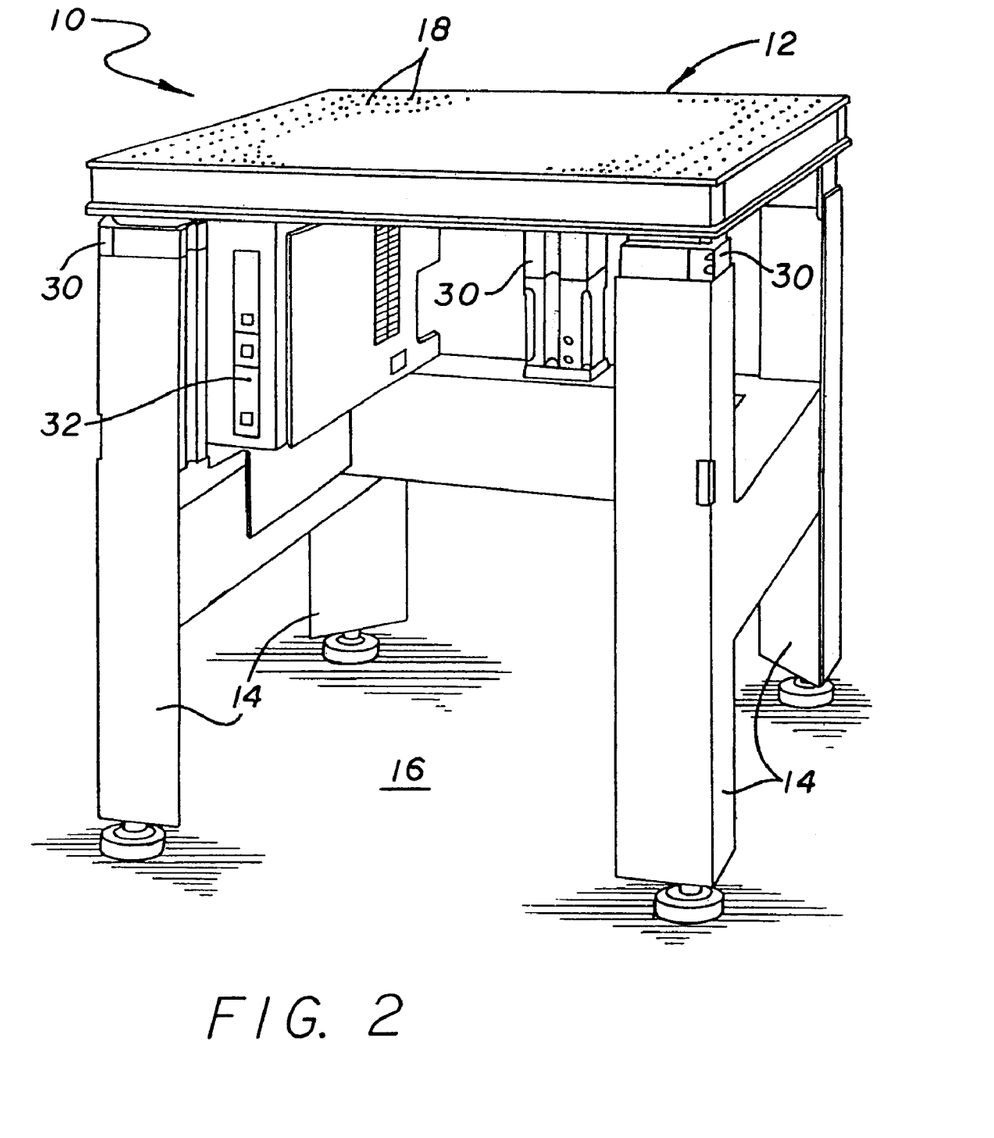
FIG. 2 is a perspective view of an embodiment of a vibration table of the present invention.

Referring to the drawings more particularly by reference numbers, FIG. 2 shows an embodiment of a table assembly 10 of the present invention. The assembly 10 may include a platform 12 that is supported by a plurality of legs 14 that extend from a floor 16. The platform 12 may have a honeycomb construction and include a plurality of mounting holes 18 that allow items such as optical mounts to be attached to the table 10. As an alternate embodiment, the platform 12 may be constructed from a slab of granite.

The table assembly 10 may include one or more vibration isolators 30 mounted to the table legs 14. The floor 16 may undergo a vibrational movement that creates a displacement of the table legs 14. The isolators 30 isolate an element such as the platform 12 from the displacement of the floor 16.

The table assembly 10 may further include a control unit 32 which controls the vibration isolators 30. The control unit 32 may control all three isolators 30. Although three isolators 30 are shown and described, it is to be understood that four or any other combination of isolators 30 may be employed in the present invention.

Figure 3:
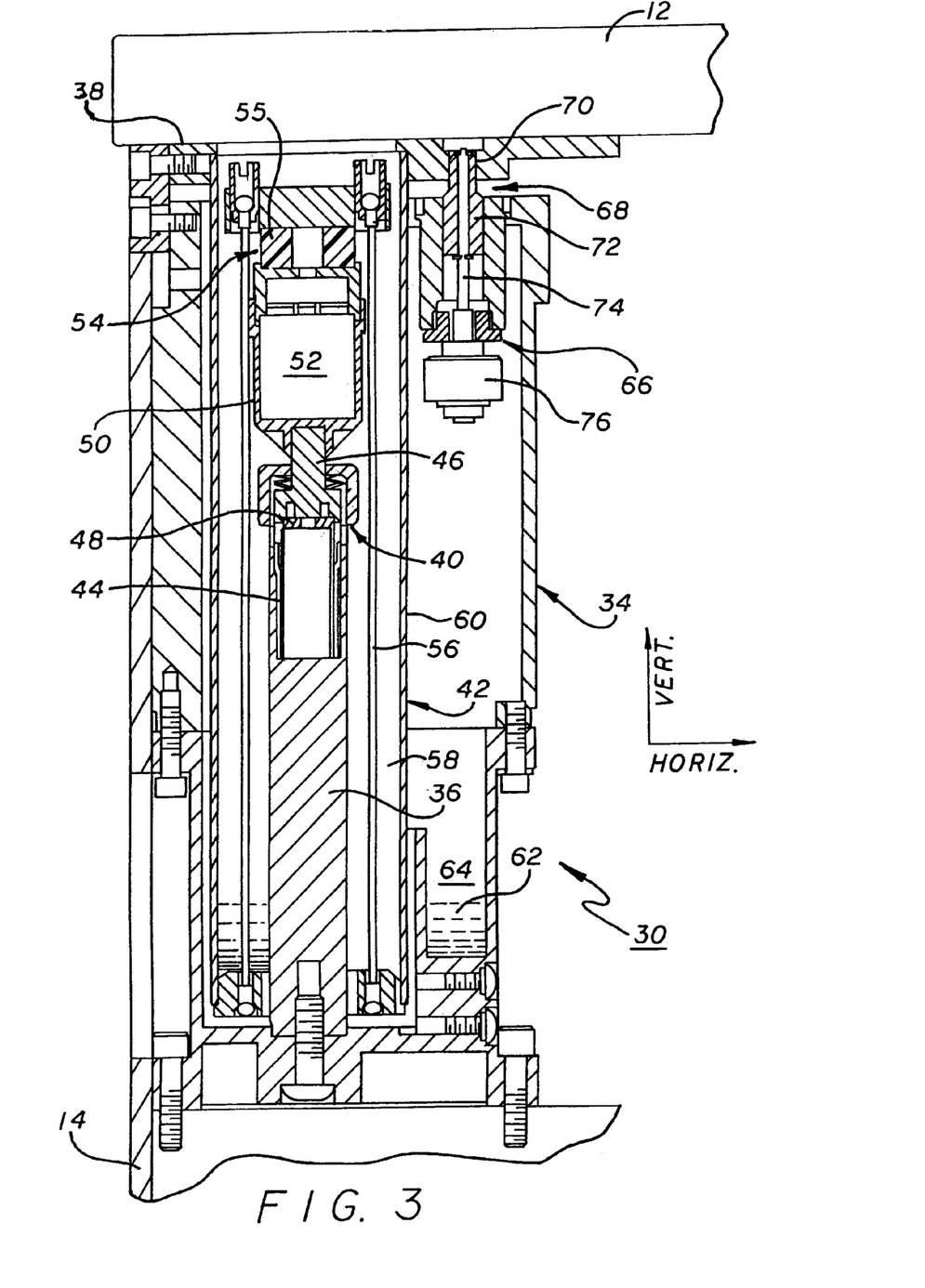
FIG. 3 is a side view of an embodiment of a vibration control module of the vibration table.

FIG. 3 shows an embodiment of a vibration isolator 30. The isolator 30 may have an outer housing 34 that is attached to the table legs 14. The isolator 30 may include a post 36 that is attached to the housing 32 and a top plate 38 that supports the platform 12.

The isolator 30 may include an active isolator assembly 40 and a passive isolator assembly 42 that isolate the top plate 38 from the housing 32. The active isolator assembly 40 may isolate the plate 38 and platform 12 in a first vertical direction. The passive isolator assembly 42 may isolate the plate 38 and platform 12 in a second horizontal direction or plane.

The active isolator assembly 40 may include a piezoelectric actuator 44 that is mounted to the post 36. The piezoelectric actuator 44 may receive a drive signal that either increases or decreases the height of the actuator 44 to isolate the platform 12 in the vertical direction. The piezoelectric actuator 44 may be constructed from a plurality of piezoelectric elements which are maintained in compression by a plurality of elastic elements such as bellville springs 46. The actuator 44 also includes a push rod 46 connected to the piezoelectric elements by connecting blocks 48.

The push rod 46 is attached to a cup 50 which houses a sensor 52. The sensor 52 may be a geophone which provides an electrical output signal that is a function of the motion of the actuator push rod 46.

The isolator 30 may include a filter assembly 54 that is coupled to the active isolator assembly 40 and the passive isolator assembly 42. The filter assembly 54 may include an elastomer 55 that filters out relatively high frequency vibrations introduced to the isolator 30 so that high frequency components are not transferred from the floor 16 to the platform 12. This reduces the requirements for active system bandwidth.

The passive isolator assembly 42 may include a plurality of cables or other tension members 56 that extend along an inner channel 58 of a tube 60. The tube 60 is in contact with the top plate 38. The cables 56 create a pendulum assembly that allows the platform 12 to translate horizontally about the post 36.

The housing may include a reservoir 62 that is filled with a fluid 64 such as oil. A portion of the tube 60 extends into the reservoir 62. The fluid filled reservoir 62 creates a dashpot that damps horizontal movement of the platform.

The isolator 30 may have a docking assembly 66 that can secure the platform 12. The docking assembly 66 may include a pin 68 that is inserted into an aperture 70 of the plate 38. The center axis of the pin 68 provides a reference point for the plate 38 and platform 12. The pin 68 may include a sleeve 72 that is attached to an output shaft 74 of an actuator 76. The actuator 76 may be a linear stepper motor. The actuator 76 is attached to the housing 34. The actuator 76 can move the pin 68 into and out of the aperture 70. During isolation, the pin 68 is pulled out of the aperture 70 to allow relative horizontal movement between the platform 12 and the floor 16. The pin 68 can be moved back into the aperture 70 to align the plate 38 and secure the platform 12.

Figures 4, 5:
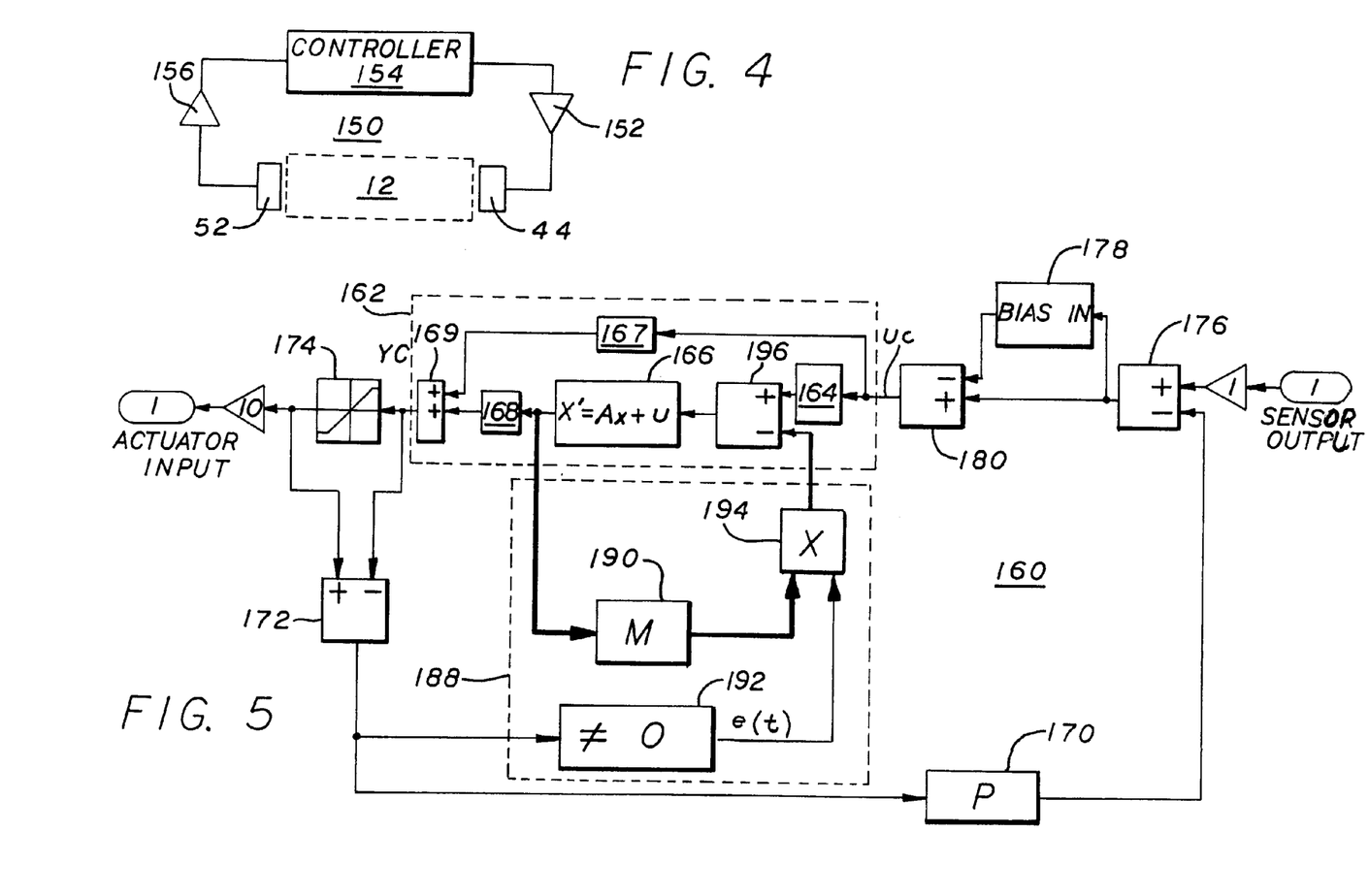
FIG. 4 is a schematic of an electrical system of the vibration control module.
FIG. 5 is a schematic of a control system of the vibration control module.

FIG. 4 shows a control system 150 for one of the control modules 30. The control system 150 may include a pre-amplifier 152 that is connected to the actuator 44 and a controller 154. The controller 154 provides an output signal to drive the actuator 44. The controller 152 receives an input signal from the sensor 52. The input signal is amplified by a pre-amplifier 156. Because the output of the sensor 52 has a relatively low amplitude it is desirable to place the pre-amplifier 156 in close physical proximity to the sensor 52 to minimize any noise created on the transmission line between these devices.

The controller 154 may have on-board analog to digital (A/D) and digital to analog (D/A) converters that allow the signals to be processed in a digital domain. The controller 154 may process the signals in conjunction with a control routine. The control routine may be a software routine that operates in conjunction with instructions and data stored in memory (not shown).

FIG. 5 is schematic of a control system 160 that represents the control routine performed by the controller 154. The control system 160 includes a nominal controller 162 that receives a control system input uc and generates a control system output yc. The control system output yc is provided to the actuator (not shown) to isolate the element (platform). The nominal controller 162 can be represented by input coupling matrix 164, dynamic coefficient matrix 166, input/output sensitivity matrix 167 and measurement sensitivity matrix 168 blocks. The matrices correlate to the following well known state and output equations that can be used to represent any physical system:

$$x'=Ax+Buc \qquad (1)$$

$$yc=Cx+Duc \qquad (2)$$

where;

x=the state variable.

x'=the time derivative of the state variable.

uc=the input to the system.

yc=the output of the system.

A=the dynamic coefficient matrix.

B=the input coupling matrix.

C=the measurement sensitivity matrix.

D=the input/output sensitivity matrix.

The nominal controller 162 can utilize equations (1) and (2) to compute the output signal yc that most effectively drives the actuator to isolate the load.

The control system 160 may include a first anti-windup stage 170 that receives a first anti-windup input and generates a first anti-windup output. The first anti-windup input may be the output of a summing junction 172. The summing junction sums the control system output yc with its saturated value sat(yc) provided by saturation block 174. The output of the first anti-windup stage 170 is summed with the output signal of the sensor at summing junction 176.

The first anti-windup stage 170 contains a transfer function that is the same or substantially similar to the transfer function of the control module 30. The anti-windup output is a response that correlates to the additional controller output which exceeds the saturation of the actuator. This response is subtracted from the output signal to stabilize the system and decrease the recovery time from a saturation event.

The control system 160 may further include a quasi-static DC bias estimator 178 that is connected to summing junctions 176 and 180. The estimator 178 identifies and subtracts the undesired DC component of the signal provided by the sensor. The estimator 178 can distinguish slow, small variations in the DC component in the sensor output due to temperature, etc. from temporary, large environmental disturbances.

Figure 6:
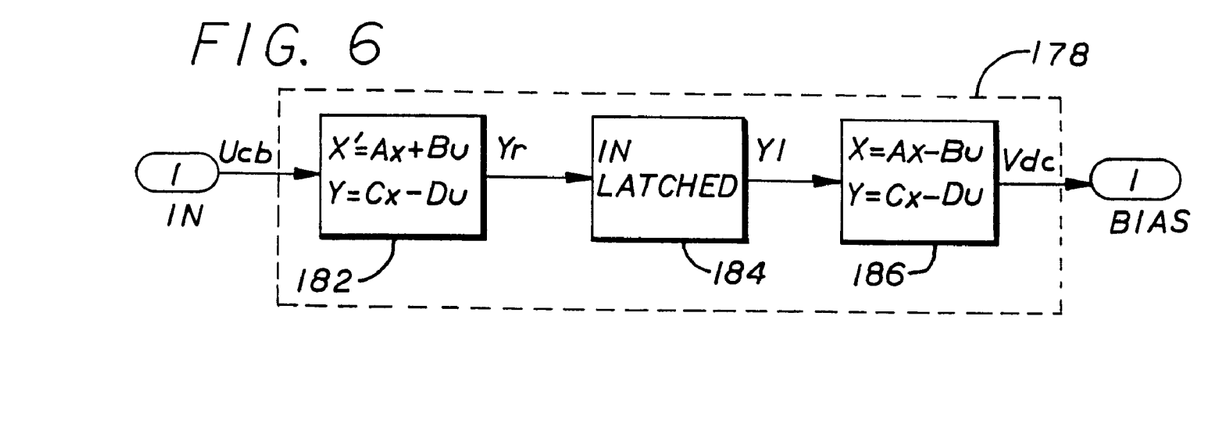
FIG. 6 is a schematic of a DC bias estimator of the control system.

FIG. 6 shows an embodiment of the bias estimator 178. The estimator 178 may include a non-linear filter 182 that produces an estimate yr of the DC offset. The estimate is latched by a latch 184 and filtered by a low pass filter 186. The estimator 178 may be a first order time varying filter:

$$yr'=-h(t)yr(t)+h(t)uc(t) \quad (3)$$

where;

yr(t)=the estimate of the DC offset.

yr'(t)=the time derivative of the estimate of the DC offset.

h(t)=a periodic function with the same period as the sampling time of the latch.

uc(t)=the input from the summing junction 176.

If h(t) is selected as a positive exponentially decaying function, the function yr(t) first rapidly converges to a neighborhood of the bias value and then as h(t) becomes smaller, converges in a slower way to the correct bias value.

The cut-off frequency of the low pass filter 186 should be below the minimum operation frequency of the module. The reliability of the estimator 178 can be further improved by adding control logic to the latch 184 that allows the latching of input only after sample intervals where the nominal controller 162 input is below certain statistical levels, or the nominal controller 1 output yc is not saturated.

Referring to FIG. 5, the control system 160 may also have a second anti-windup stage 188. The second anti-windup stage 188 can dissipate very large values that are computed by the nominal controller 162 when the actuator is saturated. The anti-windup stage 188 can have an M matrix block 190 and an enable block 192 that are connected to a product junction 194. The product junction 194 multiplies the output of the M matrix block 190 with an output signal e(t) of the enable block 192. The result is provided to a summing junction 196 of the nominal controller 162.

The enable block 192 receives as an input the output of summing junction 172. The enable block 192 provides an output e(t) to the product block 194. The value of e(t) is a 1 when the system is in saturation and a 0 when the system is not in saturation. In this manner the M matrix is provided to the nominal controller 162 only when the system is in saturation. The second anti-windup stage 188 does not affect the nominal controller 162 when the system is not in saturation.

The state and output equations of the second anti-windup stage 180 can be represented as follows:

$$x'=(A+e(t)M)x+Buc \quad (4)$$

$$y'=Cx'+Duc' \quad (5)$$

The state variable x is multiplied with the M matrix only when the system is in saturation and e(t) is equal to 1. The M matrix dissipates large values calculated by the state variable of the nominal controller 162.

Figure 7:
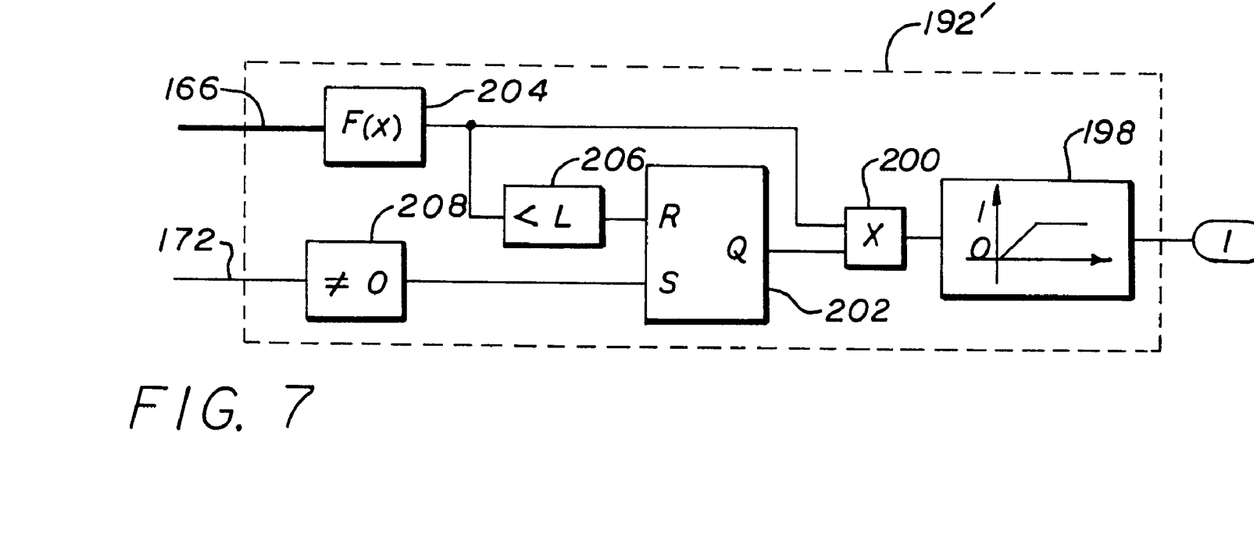
FIG. 7 is a schematic of an enable block of a second anti-windup stage of the control system.

FIG. 7 shows an alternate embodiment of the enable block 192' which has an additional input constituted by the output of dynamic coefficient matrix 166 which is the state variable of the nominal controller.

The output e(t) of the enable block 192' may be constrained between 0 and 1 by means of a limiter 198 with an input that may be the output of a product 200 between the output of a flip-flop 202 and an output F(x) of a function 204 of the dynamic coefficient matrix 166. A flip-flop 204 may be reset when the output of the function 204 is smaller than a limit value L via the boolean function 206, and may be set when the output of the summing junction 172 is non zero via a boolean function 208. This embodiment allows the block 192' to dissipate the state variable shortly after recovering from saturation. The role of the enable block in FIG. 7 is to dissipate the state variable for a limited time after the system has exited saturation, thus making the isolation recovery more robust.

Figure 8:
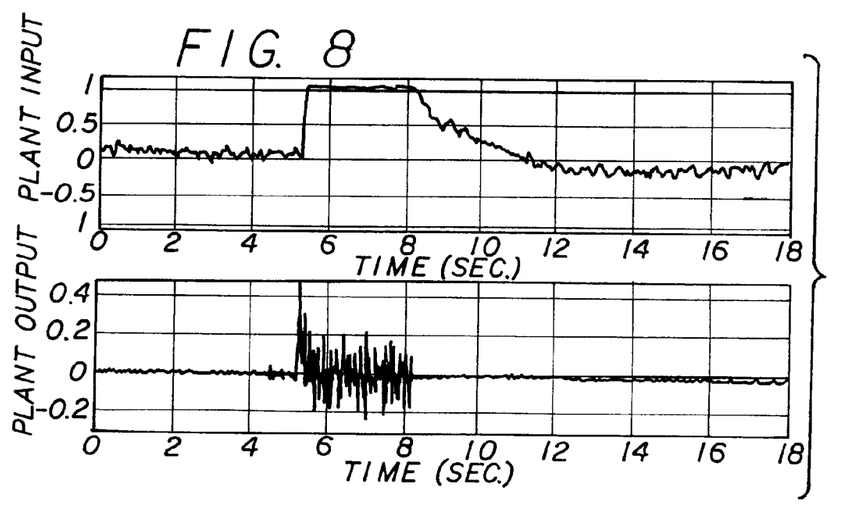
FIG. 8 are graphs showing the plant input and plant output of the vibration control module of the present invention subject to saturation.

FIG. 8 shows the results of an experiment conducted with a vibration control module of the present invention. These results should be construed with the graphs of FIG. 1. As shown in FIG. 8, the time to stabilize the system of the present invention after saturation is approximately 3 seconds. This is to be contrasted with a module without anti-windup that requires approximately 20 seconds to stabilize as shown in FIG. 1.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A vibration control module for an element, comprising:

a sensor that can sense a movement of the element and provide an output signal that corresponds to the element movement;

an actuator that can move the element in accordance with a control system output, said actuator having a saturation value; and, a controller that can receive the output signal from said sensor and provide the control system output to said actuator, said controller generates the control system output in accordance with a control routine that includes a nominal controller that receives a control system input, and a first anti-windup stage that receives a first anti-windup input that is a function of the control system output and the actuator saturation value, and a first anti-windup output that is summed with the output signal and provided to the nominal controller.

2. The module of claim 1, further comprising a second anti-windup stage that is coupled to said nominal controller.

3. The module of claim 2, wherein said second anti-windup stage provides an input to said nominal controller when the control system output is at least equal to the saturation value.

4. The module of claim 3, wherein said nominal controller has a state variable and said second anti-windup stage input dissipates said state variable.

5. The module of claim 4, wherein said second anti-windup stage input includes a matrix that is multiplied with a state variable of said nominal controller.

6. The module of claim 1, further comprising a DC bias estimator that is coupled to said nominal controller.

7. The module of claim 6, wherein said DC bias estimator provides an output that is summed with the sum of the sensor output signal and the first anti-windup output.

8. The module of claim 6, wherein said DC bias estimator includes a time varying non-linear filter that is connected to a latch, said latch being connected to a low pass filter.

9. The module of claim 1, wherein the vibration control module has a transfer function and the first anti-windup stage has a transfer function that is substantially similar to the vibration control module transfer function.

10. The module of claim 1, wherein said actuator includes a piezoelectric element.

11. A vibration control module for an element, comprising:
 a sensor that can sense a movement of the element and provide an output signal that corresponds to the element movement;
 an actuator that can move the element in accordance with a control system output, said actuator having a saturation value; and,
 a controller that can receive the output signal from said sensor and provide the control system output to said actuator, said controller generates the control system output in accordance with a control routine that includes a nominal controller that receives a control system input and provides the control system output, said nominal controller has a state variable, said control routine includes an anti-windup stage that provides a matrix that is multiplied with the state variable of said nominal controller when the control system output is at least equal to the saturation value.

12. The module of claim 11, further comprising a DC bias estimator that is coupled to said nominal controller.

13. The module of claim 12, wherein said DC bias estimator includes a time varying non-linear filter that is connected to a latch, said latch being connected to a low pass filter.

14. The module of claim 11, wherein the matrix dissipates the state variable.

15. A method for isolating an element, comprising:
 transmitting an output signal that corresponds to a movement of the element;
 generating a control system input that is a function of the output signal;
 generating a control system output from the control system input;
 transmitting the control system output to an actuator to move the element;
 generating a first anti-windup input that is a sum of the control system output and an actuator saturation value;
 generating a first anti-windup output that is a function of the first anti-windup input and a transfer function; and,
 summing the first anti-windup output with the output signal, wherein the control system input is a function of the sum between the first anti-windup output and the output signal.

16. The method of claim 15, wherein a DC bias signal is summed with the sum of the output signal and the first anti-windup output.

17. The method of claim 15, wherein a second anti-windup output is summed with the control system input when the control system output is no less than the saturation value.

18. The method of claim 17, wherein the second anti-windup output is multiplied with a state variable.

19. The method of claim 15, wherein the transfer function is substantially similar to a transfer function of a vibration control module that contains the sensor and the actuator.

20. A method for isolating an element, comprising:
 transmitting an output signal that corresponds to a movement of the element;
 generating a control system input that is a function of the output signal;
 generating a control system output from the control system input;
 transmitting the control system output to an actuator to move the element; and,
 multiplying an anti-windup output with a state variable when the control system output is no less than a saturation value.

21. The method of claim 20, wherein a DC bias signal is summed with the control system input.

22. The method of claim 20, wherein the anti-windup output is multiplied with the state variable for a predetermined time interval after the control system output is less than the saturation value.

* * * * *